Jan. 12, 1932.                R. P. DUNMIRE                1,840,312
                            THREADLESS CONNECTER
               Original Filed Feb. 21, 1928      3 Sheets-Sheet 2
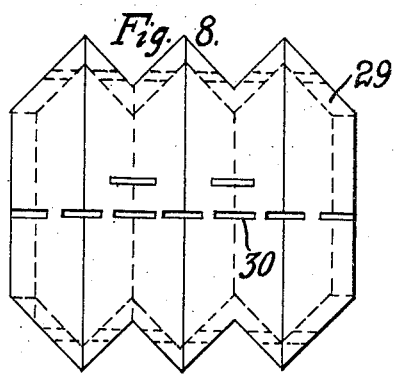
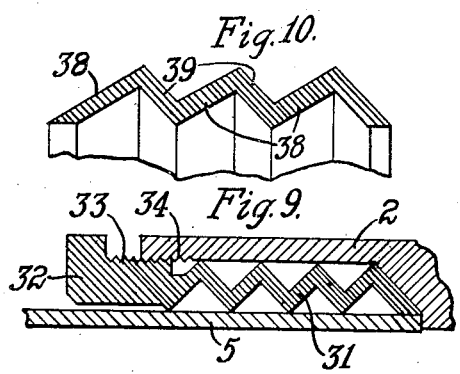
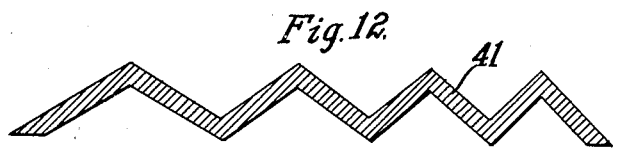
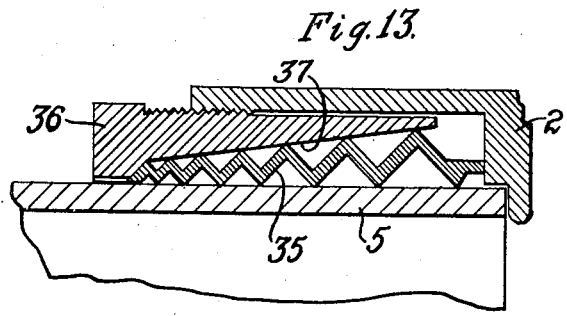
INVENTOR.
Russell P. Dunmire
BY William B. Jaspert
ATTORNEYS.
WITNESS:
H. J. Procter Patented Jan. 12, 1932

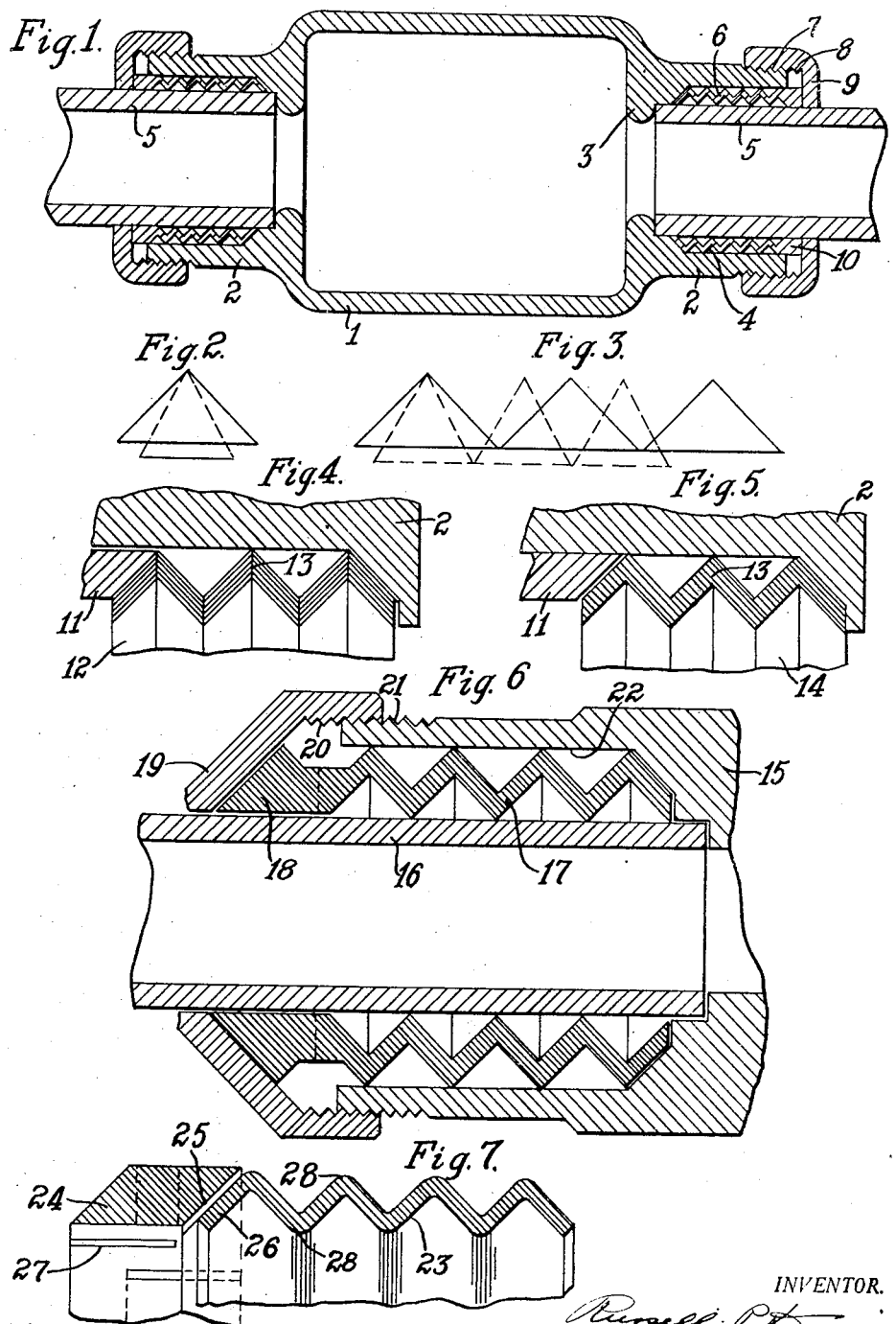

1,840,312

UNITED STATES PATENT OFFICE

RUSSELL P. DUNMIRE, OF ALLIANCE, OHIO

THREADLESS CONNECTER

Application filed February 21, 1928, Serial No. 255,952. Renewed May 25, 1931.

This invention relates to connecters for conduits, cables and the like with one or more openings or joints, and more particularly to threadless connecters which are adapted to join the ends of conduits or cables without machining the bodies to be joined.

It is among the objects of this invention to provide connecters which are adapted to intimately engage the bodies to be joined and to form a leak proof seal at their points of connection, thereby rendering the connecters useful in a wide field of application.

Another object of the invention is to provide connecters of the above designated character which may be of simple compact and durable mechanical construction, which may embody a minimum number of parts and which may be relatively inexpensive to manufacture in production quantities.

These and other objects will become more apparent from a consideration of the accompanying drawings in which like characters designate like parts and in which Fig. 1 is a longitudinal sectional view of a connecter element embodying the principles of this invention; Figs. 2 and 3 are diagrammatic views illustrating the functional characteristics of the connecter elements; Figs. 4 and 5 cross sectional views of the fragmentary portions of the connecter elements; Fig. 6 a longitudinal sectional view of a modified form of connecter illustrated in Fig. 1, showing the locking means as comprising a corrugated sleeve adapted for engagement with the bodies to be joined; Fig. 7 a sectional elevational view of a fragmentary portion of a corrugated sleeve illustrating a modified form thereof; Fig. 8 a side elevational view of the sleeve portion; Fig. 9 a cross sectional view of a fragmentary portion of the connecter illustrating a follower formed integrally with the corrugated sleeve and Figs. 10 to 19 inclusive, cross sectional views of various forms of corrugated sleeve elements which may be utilized in the practice of this invention.

Referring to Fig. 1 of the drawings, the structure therein illustrated comprises a sleeve portion 1 having restricted ends 2 provided with shoulders 3 and cylindrical bores 4 for receiving the ends of conduits 5 with which the sleeve member is to be joined. The ends of the conduits 5 are in abutment with the shoulders 3 of the sleeve to prevent axial movement as well as to protect wire being drawn therein, and the conduits are locked to the sleeve member 1 by means of a collapsible corrugated sleeve or bushing 6 which is disposed intermediate the conduit 5 and the bore 4 of the sleeve. The ends of the sleeve member 1 are provided with threads 7 which are adapted to interact with screw threads 8 of a ring nut 9 which is provided with a radial flange adapted to engage the follower 10 of the corrugated sleeve 6.

The joint is formed by screwing the ring nut 9 on the thread 7 of the sleeve 1 whereby the corrugations of the member 6 are compressed in an axial direction and the depth of the corrugations are thereby caused to increase to intimately engage the inner surface of the bore 4 and the outer periphery of the conduit 5. By compressing the corrugated surface 6 the pitch of the corrugations is decreased and the depth increased, thus effecting a radial displacement of the corrugations in both directions against the retaining wall portions of the sleeve 1 and conduit 5 whereby they are intimately locked.

The theory upon which the corrugated sleeve 6 operates is more readily understood in connection with Figs. 2 and 3 of the drawings in which the full lines represent a series of isosceles triangles corresponding to the corrugations of the sleeve 6. Dotted lines illustrate the change in the altitude and base of the angles when pressure is brought to bear against the sides of the angles, assuming of course that the triangles are collapsible as is the case in the metal sleeve member 6. Accordingly, by decreasing the base of the angles or the pitch of the corrugations the depth or height is increased in accordance with the degree of pressure brought to bear upon the corrugated sleeve 6, and in accordance with the resistivity of the restraining wall elements of the connecter sleeve 1 and the body to be joined, such as the conduit 5 in Fig. 1 of the drawings.

The principle of the triangles is further illustrated in Figs. 4 and 5 as follows:—In Fig. 4 the body portion 2 restrains the corrugated element against radial displacement and the member 11 constitutes the follower which applies pressure to the corrugated elements. The corrugated members of Fig. 4 comprises a series of annular tapered washers 12 which are disposed with their bases in abutment, as illustrated, to form the corrugations 13. This form of construction may be adopted in practice as desired but for the sake of economy it is more desirable to form an integral sleeve member 14 as shown in Fig. 5 provided with the corrugations as therein shown.

In the modification illustrated in Fig. 6, the body portion 15 may be a part of a connecter sleeve, as the sleeve 1 in Fig. 1, or it may be the end of a body to be joined with the conduit 16. The corrugated sleeve 17 of the type illustrated in Fig. 5 is disposed between the members 15 and 16 and is further provided with a follower 18 made integrally with the corrugations 17. A tapered nut 19 having threads 20 interacting with the threaded portion 21 of the member 15 is adapted to compress the sleeve member 17 in an axial direction to shorten the base or pitch of the triangular shaped corrugations, thereby increasing their height and tending to force their peaks into the cylindrical bore 22 of the member 15 and the outer face of the conduit 16. The annular tapered end of the follower 18 which is radially slotted is also collapsed by the member 19 and forms a long flat seat between the follower 18 and conduit 16 which acts as an auxiliary connection but more especially as a vibration dampener to protect the joint formed by the corrugated bushing from vibration.

The member 17 may be formed of brass or other suitable metal which may be chosen in accordance with the character of the bodies to be joined to either force the corrugated sleeve into the joined bodies or to force them against the engaging faces thereof as the case may be.

From a consideration of the structure shown in Figs. 1 and 6, it will appear obvious that the joints so formed constitute seals to prevent access of moisture to the interior of the conduits or to prevent the escape of liquid or gases from the conduits through the joint depending upon the particular purpose for which the connecter is employed.

In Fig. 7 the corrugated sleeve 23 is formed independently of the follower 24 which latter constitutes a bushing having faces 25 complementary in shape to the angular face 26 of the sleeve 23. The follower may be weakened by a series of slots 27 to effect its displacement when pressure is applied by a nut element such as the member 19 in Fig. 6. It is also to be noted that the corrugations of the sleeve 23 are rounded at the peaks 28 instead of being provided with the sharp pointed corrugations of the sleeve 17, Fig. 6.

In Fig. 8 a corrugated sleeve 29 is illustrated as being provided with slots 30 which may be formed in any number and disposed in any manner to weaken the sleeve, if desired, to more effectively render the sleeve member collapsible when pressure is brought to bear on the end thereof.

In Fig. 9 a corrugated sleeve 31 is provided with an integral follower 32 having a threaded portion 33 which interacts with the thread 34 of the body portion 2. The function of this form of connecter is similar to that disclosed in connection with Figs. 1 and 6.

In Fig. 13 the corrugated sleeve member 35 is tapered and the corrugations are of different pitch diameters. In this construction the follower 36 is provided with a tapered inner bore 37 for engagement with the corrugations of the sleeve 35.

Figs. 10, 11, 12 and 14 to 19 inclusive illustrate various modifications of the corrugated sleeve member which are possible in the development of the connecter for various applications.

In Fig. 10 the sleeve is shown with the corrugations having legs of different lengths, those designated at 38 being larger than the legs 39.

Fig. 11 illustrates a tapered corrugated bushing 40.

In Fig. 12 the bushing 41 is formed with corrugations having different angles and consequently different pitches.

Figure 14:
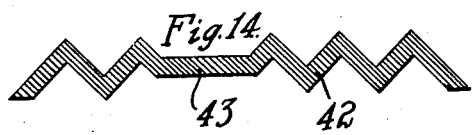
Fig. 14 illustrates a sleeve 42 provided with a central landing 43.
Figure 15:
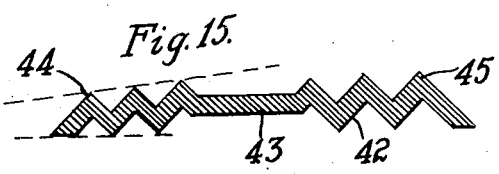
Fig. 15 illustrates a similar sleeve having angular corrugations 44 at one end thereof and straight corrugations 45 at the other end, the corrugations, or ends, may be of course tapered or straight as the case may be.
Figure 16:
Fig. 16 illustrates a sleeve 46 with varying thickness of wall.
Figure 17:
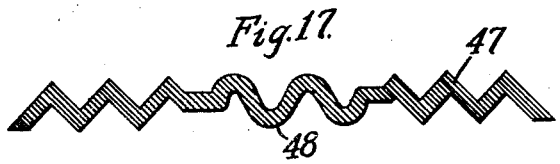
Fig. 17 illustrates a corrugated sleeve 47 with a corrugated central section 48.
Figure 18:
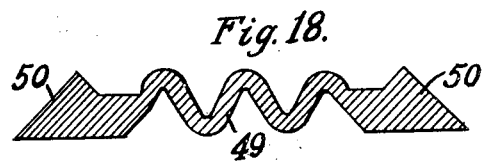
Fig. 18 illustrates still another modification of a corrugated sleeve 49 having thickened end portions 50.
Figure 19:
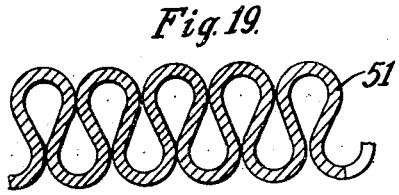
Fig. 19 illustrates a looped type of sleeve 51.

The form illustrated in Fig. 19, embodying a series of closed rounded corrugations may be applied as a sealing means for joints.

It is evident from the foregoing description of this invention that the types of connecters illustrated therein are applicable to a variety of uses where it is desired to join two bodies mechanically and to form a seal therewith. Some of the uses to which the invention may be applied are cable connecters and connecters for outlet boxes in the electrical field, also steam pipes, lead pipes and fibre ducts.

The connecters may also be utilized as a threadless pipe fitting or coupling and as a solderless wire and cable connector for various purposes in which case the corrugated bushing can be made of relatively soft material which flows around and between the strands of the cable without injuring it or cutting it and thereby forming a large area of surface contact which gives a connecter of low electrical resistance and of high tensile strength.

The invention may also be employed for joining lead or other soft metal parts to harder metals providing pressure-tight joints without resorting to the so called wiping or soldered joint connecters. It may also be applied to the joining of wires or cable to iron or steel pipes or rods for the use as an electric ground clamp without the use of solder; also as a means of providing a spliced cable joint for joining multiple conductor cables with lead sheaths without wiped or soldered joints.

Although various embodiments of the invention have been herein illustrated and described, it will be obvious to those skilled in the art that various modifications may be made in the details of construction and that the invention is applicable to a variety of uses without departing from the principles herein set forth.

I claim:

1. A threadless connecter for joining cylindrical bodies comprising the combination of the members to be joined and an expansion sleeve disposed concentrically between said members, said sleeve consisting of a tubular corrugated body having its corrugations disposed in spaced relation axially of said members and means associated with one of the members to be joined for expanding said sleeve radially to intimately engage said members.

2. A threadless connecter for joining cylindrical bodies comprising the combination of the members to be joined and an expansion sleeve disposed concentrically between said members, said sleeve consisting of a tubular corrugated body having its corrugations disposed in spaced relation axially of said members and means associated with one of the members to be joined for compressing said sleeve in an axial direction to vary the pitch of its corrugations and expand its outer diameter and contract its inner diameter to intimately join the said members.

3. A threadless connecter for joining bodies of substantially cylindrical form, comprising the combination of the members to be joined in coaxial alinement with one of the members disposed within the other and forming an annular space therebetween, and a corrugated sleeve disposed in the space between said members and having its corrugations in axially spaced relation, said sleeve having its corrugations expanded between adjacent walls of said joined members to intimately engage the same.

4. A threadless connecter as set forth in the next preceding claim in which the end of the corrugated sleeve is provided with a relatively thick wall section.

5. A threadless connecter for joining bodies of substantially cylindrical form, comprising the combination of the members to be joined in coaxial alinement with one of the members disposed within the other and forming an annular space therebetween, a corrugated sleeve disposed in the space between said members and having one end in abutment with one of said members, and means for expanding the corrugations of said sleeve in a radial direction to effect intimate contact of the inner and outer tips of the corrugations with adjacent walls of the joined members.

6. A threadless connecter as set forth in claim 5 in which one or both of the members to be joined are of relatively soft material and the sleeve member is provided with sharp corrugations to form depressions in the walls of such soft members when its corrugations are expanded.

7. A threadless connecter for joining bodies of substantially cylindrical form comprising the combination of the members to be joined in coaxial alinement with one of the members disposed within the other and forming an annular space therebetween, a corrugated sleeve disposed in the space between said members and having one end in abutment with one of said members, a follower comprising a sleeve member independently disposed coaxially with said corrugated sleeve and adapted to abut against the free end of the latter, and means for causing pressure to bear in an axial direction on the said follower whereby the corrugations of the sleeve are expanded radially to intimately engage adjacent walls of the said joined members.

8. A threadless connecter as set forth in claim 5 characterized by the corrugated sleeve being provided with weakened sections to render it more readily collapsible and expandible.

9. A threadless connecter for joining bodies of substantially cylindrical form comprising the combination of members to be joined in coaxial alinement with one of the members disposed within the other and forming an annular space therebetween, a plurality of tapered washers having their small and large ends in abutment forming corrugations in axially spaced relation disposed in the annular space between said members, and means for causing axial pressure to bear against the ends of said abutting washers to expand the same radially against adjacent walls of said joined members.

In testimony whereof, I have hereunto set my hand.

RUSSELL P. DUNMIRE.